(12) United States Patent
Kumar et al.

(10) Patent No.: US 12,474,946 B2
(45) Date of Patent: Nov. 18, 2025

(54) ORCHESTRATED SHUTDOWN OF VIRTUAL MACHINES USING A SHUTDOWN INTERFACE AND A NETWORK CARD

(71) Applicant: Dell Products L.P., Round Rock, TX (US)

(72) Inventors: Naveen Kumar, South Grafton, MA (US); Richard Rubino, Hingham, MA (US)

(73) Assignee: Dell Products L.P., Round Rock, TX (US)

( * ) Notice: Subject to any disclaimer, the term of this patent is extended or adjusted under 35 U.S.C. 154(b) by 654 days.

(21) Appl. No.: 17/720,397

(22) Filed: Apr. 14, 2022

(65) Prior Publication Data

US 2023/0333870 A1    Oct. 19, 2023

(51) Int. Cl.
    *G06F 3/00*     (2006.01)
    *G06F 9/455*    (2018.01)

(52) U.S. Cl.
    CPC ........... *G06F 9/45558* (2013.01); *G06F 2009/45575* (2013.01); *G06F 2009/45595* (2013.01)

(58) Field of Classification Search
    CPC ............................................................ G06F 9/48
    See application file for complete search history.

(56) References Cited

U.S. PATENT DOCUMENTS 8,332,570 B1 * 12/2012 Cook ................... G06F 3/0676
                                                            711/6
10,176,550 B1 * 1/2019 Baggerman ............... G06T 1/60
11,070,628 B1 * 7/2021 Memon ................. G06F 3/0664
(Continued)

FOREIGN PATENT DOCUMENTS

CN    108984266 A    * 12/2018    ......... G06F 9/45558
JP    2008276546 A   * 11/2008    ............ G06F 21/53
(Continued)

OTHER PUBLICATIONS

Ashima Agarwal, Live Migration of Virtual Machines in Cloud. (Year: 2012).*

(Continued)

*Primary Examiner* — Lechi Truong
(74) *Attorney, Agent, or Firm* — Ryan, Mason & Lewis, LLP (57) ABSTRACT

Techniques are provided for orchestrating a shutdown of virtual machines using a shutdown interface and a network card. One method comprises receiving a message sent by a controller application, executing on a network card of a hyperconverged appliance, wherein the message is sent by the controller application after shutting down one or more user-created virtual machines in response to a detected power failure of the hyperconverged appliance; performing the following steps, by a shutdown interface, in response to receiving the message: shutting down one or more system-created virtual machines and one or more physical host devices of the hyperconverged appliance. The controller application may pass control to the shutdown interface and may shut down in response to the completion of the shutting down of the user-created virtual machines. The execution of the controller application on the network card may not employ resources of the physical host devices.

20 Claims, 7 Drawing Sheets

(56) References Cited

U.S. PATENT DOCUMENTS

| | | | | |
|---|---|---|---|---|
| 11,436,112 | B1* | 9/2022 | Kumar | G06F 11/2046 |
| 2009/0259759 | A1* | 10/2009 | Miyajima | G06F 9/45558 |
| | | | | 718/1 |
| 2010/0083015 | A1* | 4/2010 | Yokota | G06F 1/3209 |
| | | | | 718/1 |
| 2011/0029974 | A1* | 2/2011 | Broyles | G06F 21/57 |
| | | | | 718/1 |
| 2018/0157561 | A1* | 6/2018 | Venkatesh | G06F 11/2043 |
| 2018/0157860 | A1* | 6/2018 | Nair | G06F 21/6218 |
| 2019/0095243 | A1* | 3/2019 | Wu | G06F 9/4856 |
| 2020/0019343 | A1* | 1/2020 | Bronnikov | G06F 3/0664 |
| 2020/0183725 | A1* | 6/2020 | Grehan | G06F 3/0664 |
| 2020/0341797 | A1* | 10/2020 | Tsirkin | G06F 3/0647 |
| 2020/0409739 | A1* | 12/2020 | Kamath | H04L 47/125 |
| 2021/0117175 | A1* | 4/2021 | Hall | H04L 63/0281 |
| 2022/0107845 | A1* | 4/2022 | Young | G06F 11/3006 |
| 2022/0179660 | A1* | 6/2022 | Grehan | G06F 9/45558 |
| 2022/0179809 | A1* | 6/2022 | Venkataramani | G06F 3/0664 |
| 2022/0269571 | A1* | 8/2022 | Mantri | G06F 11/1484 |
| 2022/0326977 | A1* | 10/2022 | Franciosi | G06F 11/1484 |
| 2023/0009160 | A1* | 1/2023 | Fan | G06F 3/0604 |
| 2023/0103766 | A1* | 4/2023 | Agarwal | G06F 8/658 |
| | | | | 717/168 |
| 2023/0115604 | A1* | 4/2023 | Franciosi | G06F 11/14 |
| | | | | 718/1 |
| 2023/0237170 | A1* | 7/2023 | Thummala | G06F 21/6218 |
| | | | | 726/26 |
| 2024/0211013 | A1* | 6/2024 | Parab | G06F 11/1464 |
| 2025/0004809 | A1* | 1/2025 | Hermenier | G06F 9/45558 |

FOREIGN PATENT DOCUMENTS

| | | | | |
|---|---|---|---|---|
| JP | 2016206705 A | * | 12/2016 | |
| WO | WO-2019051439 A1 | * | 3/2019 | H04L 63/029 |
| WO | WO-2023163764 A1 | * | 8/2023 | G06F 9/485 |

OTHER PUBLICATIONS

W. Mexner, Control System Virtualization at Karlsruhe Research Accelerator. (Year: 2019).*

Michael Le, ReHype: Enabling VM Survival Across Hypervisor Failures. (Year: 2011).*

"Shut down a VxRail Cluster", https://docs.delltechnologies.com/bundle/RAIL_AG_70/page/GUID-DA69FD52-38B2-465E-B8D9-45191B016679.html#:~:text=From%20the%20VMware%20vSphere%20Client,Next%20to%20continue%20shutting%20down. updated Feb. 4, 2022; Downloaded on Mar. 30, 2022.

Singh, Sukhjeet, "VXRail Cluster Shutdown and Startup Procedure", https://sukhjeetsingh.com/2021/02/01/vxrail-cluster-shutdown-and-startup-procedure/, dated Feb. 1, 2021; Downloaded on Mar. 30, 2022.

"vSAN Monitoring and Troubleshooting", Update 3; https://docs.vmware.com/en/VMware-vSphere/7.0/com.vmware.vsphere.vsan-monitoring.doc/GUID-31B4F958-30A9-4BEC-819E-32A18A685688.html; Downloaded on Mar. 30, 2022.

"Dell EMC VxRail RESTful API Cookbook", https://usermanual.wiki/m/78edd057abb6c818e4bb65bea76607550f90343d88209d2c72da45a3cde40651 (cover pages and Section 10); dated Aug. 2020; Downloaded on Mar. 30, 2022.

* cited by examiner

VIRTUAL MACHINE SHUTDOWN ORCHESTRATION PROCESS 300

1. CONTROLLER APPLICATION 164 ON THE NETWORK CARD 160 SHUTS DOWN USER-CREATED VIRTUAL MACHINES 140 AFTER A POWER FAILURE OF THE HYPERCONVERGED CLUSTER MANAGEMENT APPLIANCE 102;

2. CONTROLLER APPLICATION 164 SENDS TASK COMPLETION MESSAGE TO SHUTDOWN INTERFACE 128, PASSES CONTROL TO THE SHUTDOWN INTERFACE 128 AND CONTROLLER APPLICATION 164 SHUTS ITSELF DOWN;

3. SHUTDOWN INTERFACE 128 SHUTS DOWN SYSTEM-CREATED VIRTUAL MACHINES 120 AND HOST DEVICES 110 OF THE HYPERCONVERGED CLUSTER MANAGEMENT APPLIANCE 102

ORCHESTRATED SHUTDOWN OF VIRTUAL MACHINES USING A SHUTDOWN INTERFACE AND A NETWORK CARD

FIELD

The field relates generally to information processing systems, and more particularly to shutting down virtual machines in such systems.

BACKGROUND

Information processing systems are often configured to execute applications on virtual machines of a host device. It is often difficult, however, to properly shut down such virtual machines, for example, in the event of a power failure associated with the host device.

SUMMARY

In one embodiment, a method comprises receiving a message sent by a controller application, executing on at least one network card of a hyperconverged appliance, wherein the message is sent by the controller application after shutting down one or more user-created virtual machines in response to a detected power failure of the hyperconverged appliance; performing the following steps, by a shutdown interface of a hyperconverged appliance manager of the hyperconverged appliance, in response to receiving the message: shutting down one or more system-created virtual machines; and shutting down one or more physical host devices of the hyperconverged appliance.

In some embodiments, the controller application passes control to the shutdown interface and the controller application shuts itself down in response to the completion of the shutting down of the one or more user-created virtual machines by the controller application.

In one or more embodiments, the execution of the controller application on the at least one network card does not employ resources of the one or more physical host devices. In addition, the shutdown interface may send a retry message to the controller application in response to determining that at least one of the one or more user-created virtual machines has not been shut down.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for orchestrating a shutdown of virtual machines using a shutdown interface and a network card.

One or more aspects of the disclosure recognize that for a graceful shutdown of one or more nodes in an information processing system, it is important that user-created virtual machines are shutdown first, followed by a shutdown of the system-created virtual machines. Generally, the system-created virtual machines are shut down after the user-created virtual machines because the system-created virtual machines maintain configuration-related details that are important for successfully powering up one or more nodes in an information processing system, as well as the user-created virtual machines, at a later time.

In one or more embodiments, virtual machine shutdown orchestration techniques are provided that enable a user to define a sequence (e.g., an order) for user-created virtual machines to be shut down, and that enable the system-created virtual machines to be shut down (e.g., without the need for a customer to manually identify or group user-created virtual machines and system-created virtual machines).

In some embodiments, a controller application that executes on a network card shuts down the user-created virtual machines, and a shutdown interface, such as a shutdown application programming interface (API), discussed further below, is employed to shut down the system-created virtual machines and host devices. One or more aspects of the disclosure recognize that the use of a local network card to implement the shutdown of the user-created virtual machines allows the user-created virtual machines to be shut down without consuming resources of the host devices being shut down, or resources provided by any external host devices.

Figure 1A:
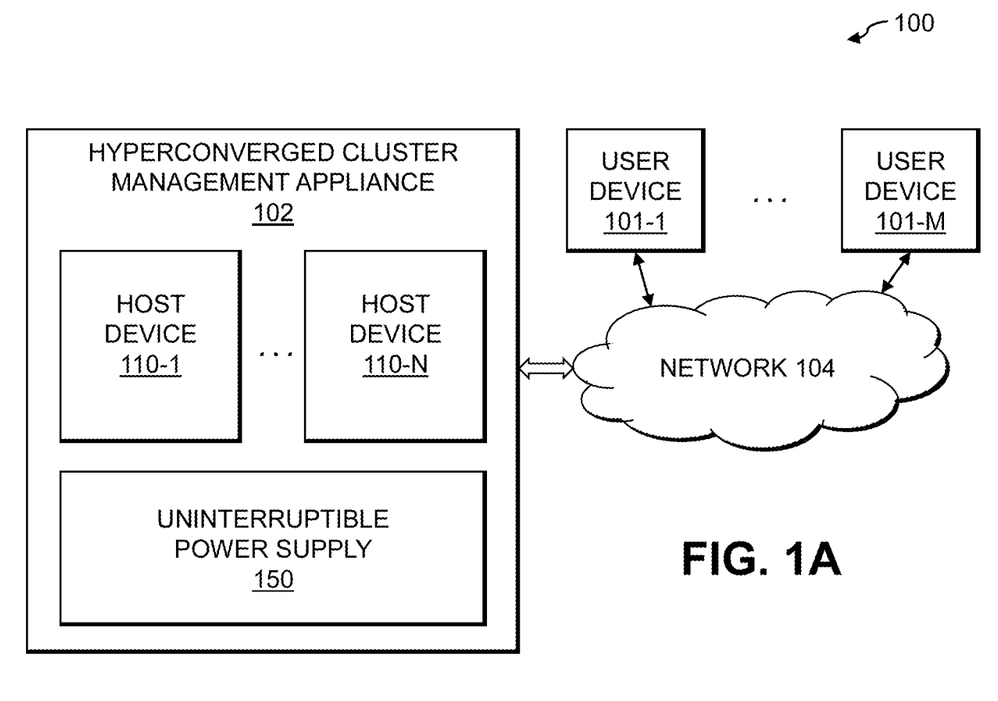
FIG. 1A illustrates an information processing system in which the disclosed techniques for orchestrating a shutdown of virtual machines using a shutdown interface and a network card can be implemented in accordance with an illustrative embodiment.

FIG. 1A shows an information processing system 100 configured in accordance with an illustrative embodiment. The information processing system 100 comprises a plurality of user devices 101-1 through 101-M, collectively referred to herein as user devices 101. The information processing system 100 further comprises one or more hyperconverged cluster management appliances 102, discussed further below in conjunction with FIGS. 1B and 1C. In some embodiments, the hyperconverged cluster management appliance 102 may be implemented as the VxRail™ hyperconverged cluster management appliance commercially available from Dell EMC, as modified herein to incorporate the features and functions of the present disclosure. While one or more embodiments may be described herein in the context of the VxRail™ hyperconverged cluster management appliance, the disclosed techniques for orchestrating a shutdown of virtual machines using a shutdown interface and a network card may be implemented on any other platforms that can host a shutdown interface, as would be apparent to a person of ordinary skill in the art based on the present disclosure.

The user devices 101 may comprise, for example, host devices and/or devices such as mobile telephones, laptop computers, tablet computers, desktop computers or other types of computing devices (e.g., virtual reality (VR) devices or augmented reality (AR) devices). Some of these processing devices are also generally referred to herein as "computers." The user devices 101 may comprise a network client that includes networking capabilities such as ethernet, Wi-Fi, etc.

One or more of the user devices 101 and the hyperconverged cluster management appliance 102 may be coupled to a network 104, where the network 104 in this embodiment is assumed to represent a sub-network or other related portion of a larger computer network. The network 104 is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the user devices 101 and the hyperconverged cluster management appliance 102 illustratively comprise processing devices of one or more processing platforms. For example, the hyperconverged cluster management appliance 102 can comprise one or more processing devices each having a processor and a memory, possibly implementing virtual machines and/or containers, although numerous other configurations are possible. The processor illustratively comprises a microprocessor, a microcontroller, a central processing unit (CPU), a graphics processing unit (GPU), a tensor processing unit (TPU), an application-specific integrated circuit (ASIC), a field-programmable gate array (FPGA) or other type of processing circuitry, as well as portions or combinations of such circuitry elements.

One or more of the user devices 101 and the hyperconverged cluster management appliance 102 can additionally or alternatively be part of edge infrastructure and/or cloud infrastructure such as an Amazon Web Services (AWS) system. Other examples of cloud-based systems that can be used to provide at least portions of the user devices 101 and/or the hyperconverged cluster management appliance 102 include Google Cloud Platform (GCP) and Microsoft Azure.

As shown in FIG. 1A, the exemplary hyperconverged cluster management appliance 102 comprises a plurality of host devices 110-1 through 110-N, collectively referred to herein as host devices 110, and an uninterruptible power supply 150. An exemplary implementation of host device 110-1 is discussed further below in conjunction with FIG. 1B. An exemplary implementation of the uninterruptible power supply 150 is discussed further below in conjunction with FIG. 1C.

In some embodiments, the hyperconverged cluster management appliance 102 combines the multiple host devices 110 into a cluster and logically looks like a single host device. The host devices 110 are shutdown in various embodiments of the disclosed techniques for virtual machine shutdown orchestration.

The hyperconverged cluster management appliance 102 may further include one or more additional components typically found in conventional implementations of such appliance devices, although such additional components are omitted from the figures for clarity and simplicity of illustration.

In the FIG. 1A embodiment, the hyperconverged cluster management appliance 102 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the hyperconverged cluster management appliance 102 to reside in different data centers. Numerous other distributed implementations of the components of the system 100 are possible.

As noted above, the hyperconverged cluster management appliance 102 may have one or more associated databases (not shown in FIG. 1A) configured to store information related to the operation of the hyperconverged cluster management appliance 102. Such databases may be implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 101 and the hyperconverged cluster management appliance 102 can be one or more input/output devices (not shown), which illustratively comprise keyboards, displays or other types of input/output devices in any combination. Such input/output devices can be used, for example, to support one or more user interfaces to a user device 101, as well as to support communication between the hyperconverged cluster management appliance 102 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1A for orchestrating a shutdown of virtual machines using a shutdown interface and a network card is presented by way of illustrative example only, and in other embodiments additional or alternative elements may be used. Thus, another embodiment includes additional or alternative systems, devices and other network entities, as well as different arrangements of modules and other components.

Figure 1B:
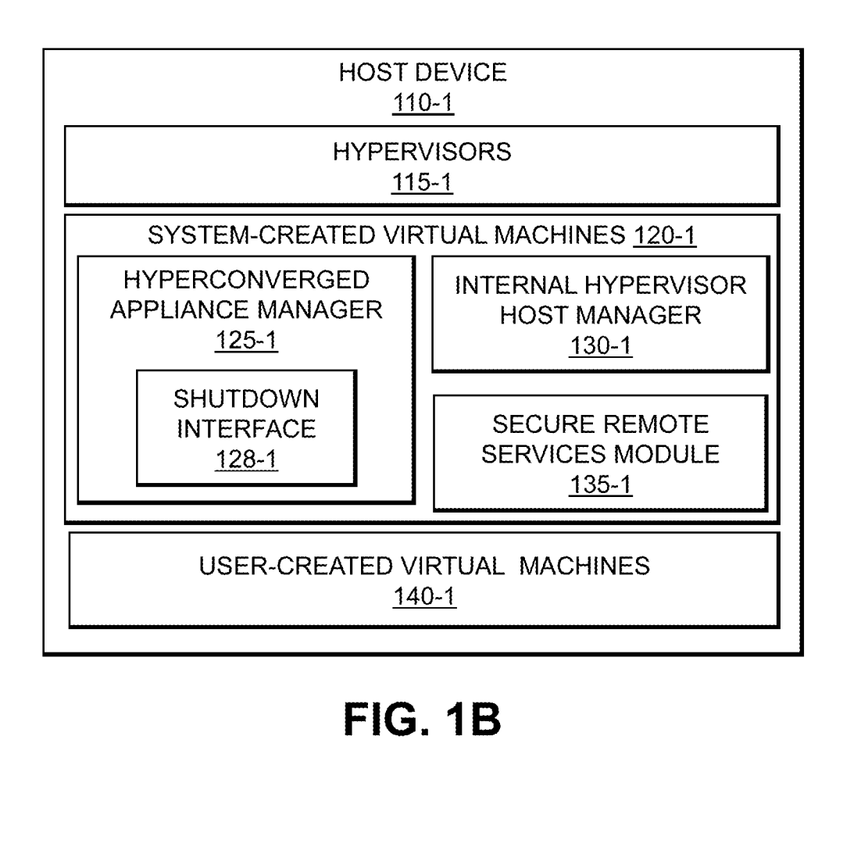
FIG. 1B illustrates one of the host devices of FIG. 1A in further detail in accordance with an illustrative embodiment.

FIG. 1B illustrates the host device 110-1 of FIG. 1A in further detail in accordance with an illustrative embodiment. Host device 110-N of FIG. 1A is configured in a similar manner as host device 110-1. In the example of FIG. 1B, host device 110-1 comprises one or more hypervisors 115-1, one or more system-created virtual machines 120-1 and one or more user-created virtual machines 140-1. The exemplary system-created virtual machines 120-1 comprise a hyperconverged appliance manager 125-1, an internal hypervisor host manager 130-1 and a secure remote services module 135-1. The hyperconverged appliance manager 125-1 further comprises a shutdown interface.

The system-created virtual machines 120-1 and the user-created virtual machines 140-1 execute on one or more of the host devices 110 of FIG. 1A using corresponding hypervisors 115. Thus, shutting down a host device 110 also shuts down the corresponding hypervisors 115. In some embodiments, each of the host devices 110 of the hyperconverged cluster management appliance 102 (FIG. 1A) are shutdown, e.g., in a sequential manner, as part of the disclosed virtual machine shutdown orchestration.

As used herein, the system-created virtual machines 120 comprise those virtual machines created by the system, for example, as part of an initialization of a cluster of host devices 110. The user-created virtual machines 140 comprise those virtual machines created by a user and/or customer to execute a workload on a cluster.

As noted above, in some embodiments, the hyperconverged cluster management appliance 102 may be implemented as the VxRail™ hyperconverged cluster management appliance commercially available from Dell EMC. In addition, in at least some embodiments, the hyperconverged appliance manager 125-1 may be implemented as the VxRail™ manager commercially available from Dell EMC, as modified herein to incorporate the features and functions of the present disclosure, for management and analytic tools for VxRail cluster operations. The hyperconverged appliance manager 125-1 provides tools in some embodiments to create and/or configure the user-created virtual machines 140, for example, from the user devices 101.

The internal hypervisor host manager 130-1 may be implemented as the Embedded vCenter commercially available from Dell EMC, which can be deployed by VxRail™ during system creation.

In addition, a shutdown interface 128-1 may be implemented, for example, using the shutdown API portion of the VxRail™ manager commercially available from Dell EMC. Among other benefits, the shutdown API can distinguish between system-created virtual machines and user-created virtual machines. In addition, in some embodiments, the shutdown API can shut down the system-created virtual machines in a specific order, to avoid metadata corruption and/or configuration-related errors, before shutting down the host devices 110 without manual intervention from the customer.

In some embodiments, the secure remote services module 135-1 provides a telemetry service to collect data from remote systems. In further variations, the system-created virtual machines 120 may also comprise a recover point virtual machine (RP4VM) for replication of data. It is noted that the various system-created virtual machines 120 shown in the example of FIG. 1B are merely illustrative of representative system-created virtual machines, and the shutdown of other system-created virtual machines could be performed using the disclosed virtual machine shutdown orchestration techniques, as would be apparent to a person of ordinary skill in the art.

In some embodiments, the hyperconverged appliance manager 125-1 and/or the internal hypervisor host manager 130-1 can maintain a folder that identifies the various system-created virtual machines 120, and any other virtual machines can be classified as user-created virtual machines.

It is to be appreciated that this particular arrangement of elements 115, 120, 125, 128, 130, 135 and 140 illustrated in the host device 110-1 of the FIG. 1B embodiment is presented by way of example only, and alternative arrangements can be used in other embodiments. For example, the functionality associated with elements 115, 120, 125, 128, 130, 135 and 140 in other embodiments can be combined into a single element, or separated across a larger number of elements. As another example, multiple distinct processors and/or memory elements can be used to implement different ones of elements 115, 120, 125, 128, 130, 135 and 140 or portions thereof. At least portions of elements 115, 120, 125, 128, 130, 135 and 140 may be implemented at least in part in the form of software that is stored in memory and executed by a processor.

The host device 110-1 of FIG. 1B may further include one or more additional components typically found in conventional implementations of such devices, although such additional components are omitted from the figures for clarity and simplicity of illustration.

Figure 1C:
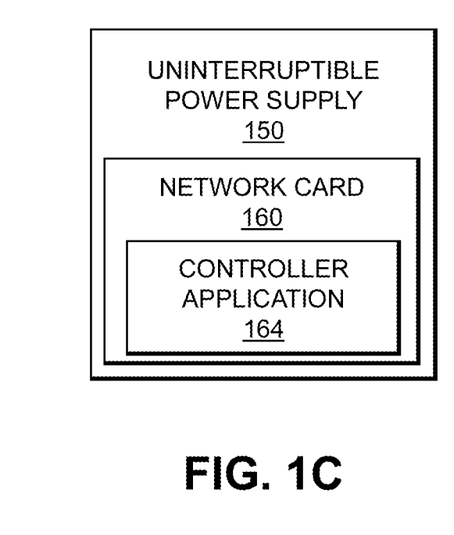
FIG. 1C illustrates the uninterruptible power supply of FIG. 1A in further detail in accordance with an illustrative embodiment.

FIG. 1C illustrates the uninterruptible power supply 150 of FIG. 1A in further detail in accordance with an illustrative embodiment. In the example of FIG. 1C, the uninterruptible power supply 150 comprises a network card 160 that executes a controller application 164 (e.g., as a virtual machine using a hypervisor).

In one or more embodiments, the controller application 164 that executes on the network card 160 shuts down the user-created virtual machines 140 and then passes control to the shutdown interface 128-1 which shuts down the system-created virtual machines 120-1 and host devices 110. As noted above, the use of the network card 160, on the uninterruptible power supply 150, to implement the shutdown of the user-created virtual machines 140 allows the user-created virtual machines 140 to be shut down without consuming resources (e.g., compute, memory, or storage resources) of the host devices 110 being shut down, or resources provided by other external host devices. The term network card, as used herein, comprises any hardware component of the uninterruptible power supply 150 configured to implement the controller application 164.

The uninterruptible power supply 150 of FIG. 1C may further include one or more additional components typically found in conventional implementations of such power supply devices, although such additional components are omitted from the figures for clarity and simplicity of illustration.

Figure 2:
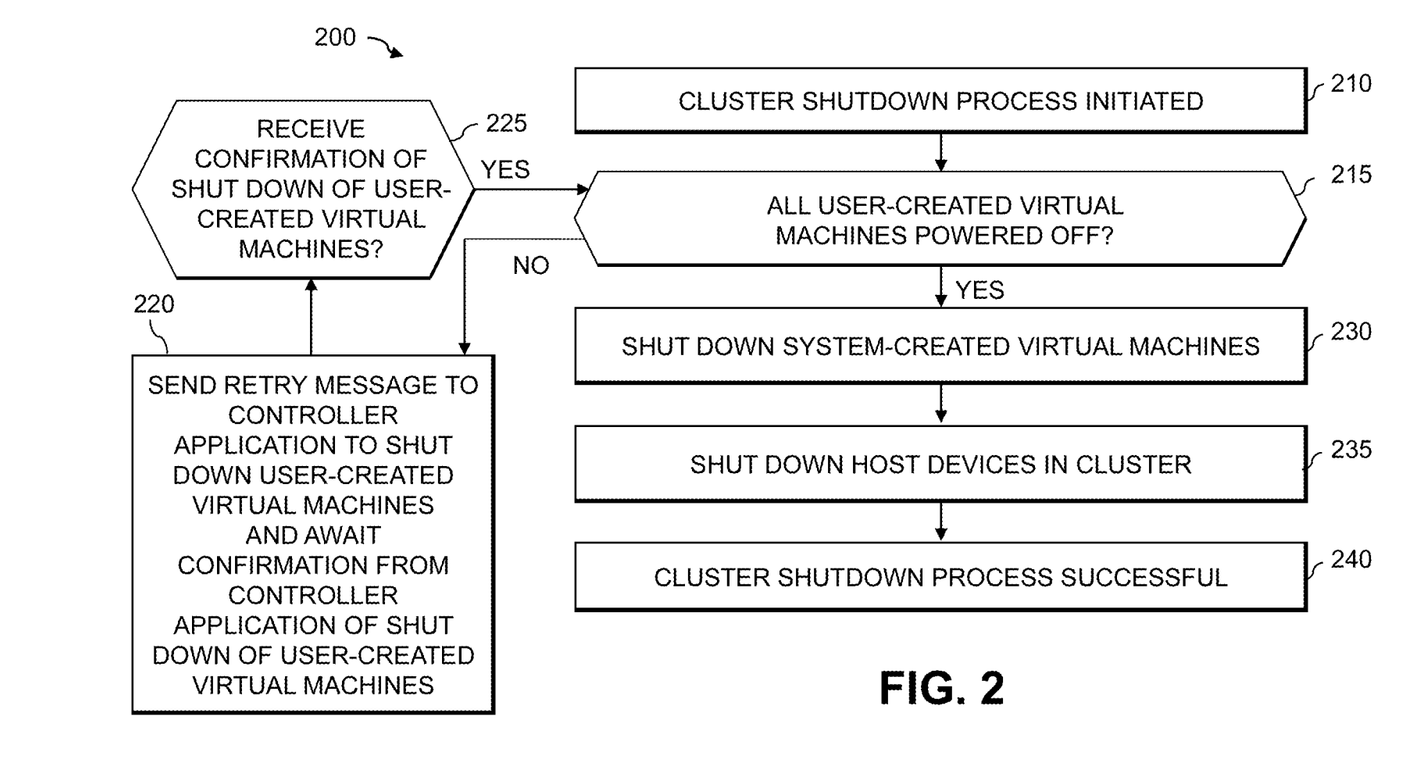
FIG. 2 is a flow diagram illustrating an exemplary virtual machine shutdown orchestration process in accordance with an illustrative embodiment.

FIG. 2 is a flow diagram illustrating an exemplary virtual machine shutdown orchestration process 200 in accordance with an illustrative embodiment. As shown in FIG. 2, the exemplary virtual machine shutdown orchestration process 200 is initiated in step 210 and performs a test in step 215 to determine if all of the user-created virtual machines 140 have been powered off. If it is determined in step 215 that all of the user-created virtual machines 140 have not been powered off, then a retry message is sent to the controller application 164 in step 220 to shut down any remaining user-created virtual machines 140, and the virtual machine shutdown orchestration process 200 awaits a confirmation from the controller application 164 indicating that the remaining user-created virtual machines 140 have been shut down.

A test is performed in step 225 to determine if the virtual machine shutdown orchestration process 200 received a confirmation from the controller application 164 indicating that the remaining user-created virtual machines 140 have been shut down. If it is determined in step 225 that the confirmation was received, then program control returns to step 215.

Once it is determined in step 215 that all of the user-created virtual machines 140 have been powered off, then the virtual machine shutdown orchestration process 200 shuts down the system-created virtual machines 120 in step 230 and the host devices 110 in step 235.

The cluster shutdown is declared to be successful in step 240 following the shut down of the system-created virtual machines 120 and the host devices 110.

Figure 3:
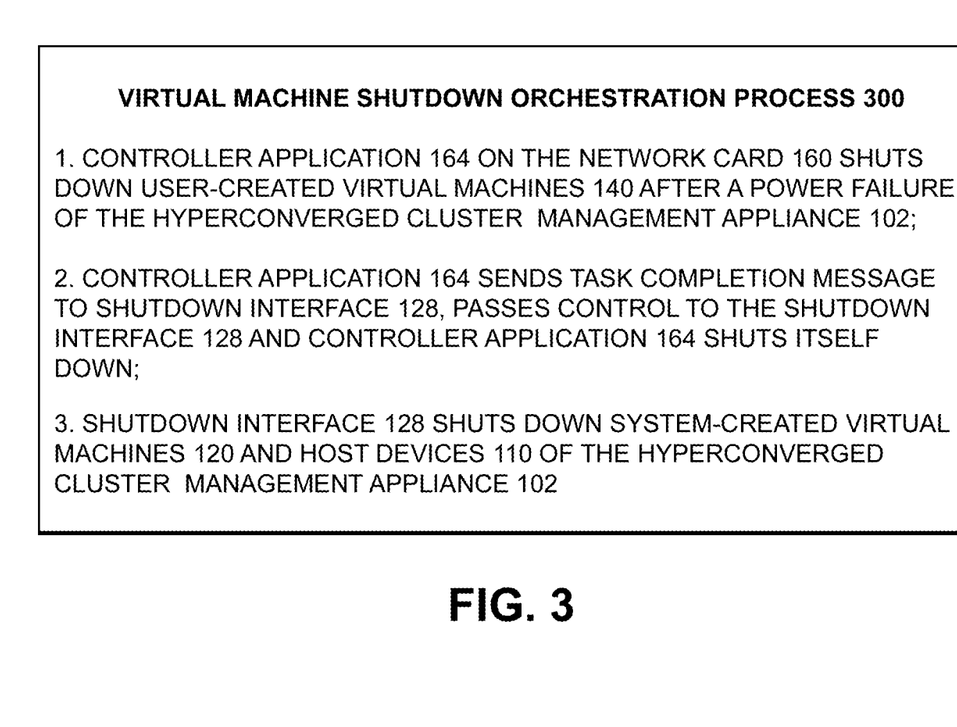
FIG. 3 illustrates exemplary pseudo code for a virtual machine shutdown orchestration process, according to one illustrative embodiment.

FIG. 3 illustrates exemplary pseudo code for a virtual machine shutdown orchestration process 300, according to one illustrative embodiment. In the example of FIG. 3, the controller application 164 on the network card 160 initially shuts down the user-created virtual machines 140 in step 1, for example, after a power failure of the hyperconverged cluster management appliance 102 (detected, for example, by the uninterruptible power supply 150 of FIG. 1C). In at least some embodiments, the shutdown of the user-created virtual machines 140 is performed by the controller application 164 or another entity or process that is distinct from the shutdown interface 128-1 provided by the hyperconverged appliance manager 125-1.

The controller application 164 may receive an acknowledgement from the internal hypervisor host manager 130-1 indicating that the shutdown process has started and the internal hypervisor host manager 130-1 may send a success code, using, for example, a REST API, to the controller application 164. After a time period, for example, the controller application 164 can send another REST API message to the internal hypervisor host manager 130-1 to determine if the user-created virtual machines have shut down. The controller application 164 receives a success code from the internal hypervisor host manager 130-1 in response to a successful shutdown of the user-created virtual machines.

In step 2, the controller application 164 sends a task completion message to the shutdown interface 128, passes control to the shutdown interface 128 and the controller application 164 shuts itself down.

In step 3, the shutdown interface 128 shuts down the system-created virtual machines 120 and the host devices 110, and the virtual machine shutdown (e.g., a shutdown of a cluster of multiple virtual machines) then completes successfully.

Figure 4:
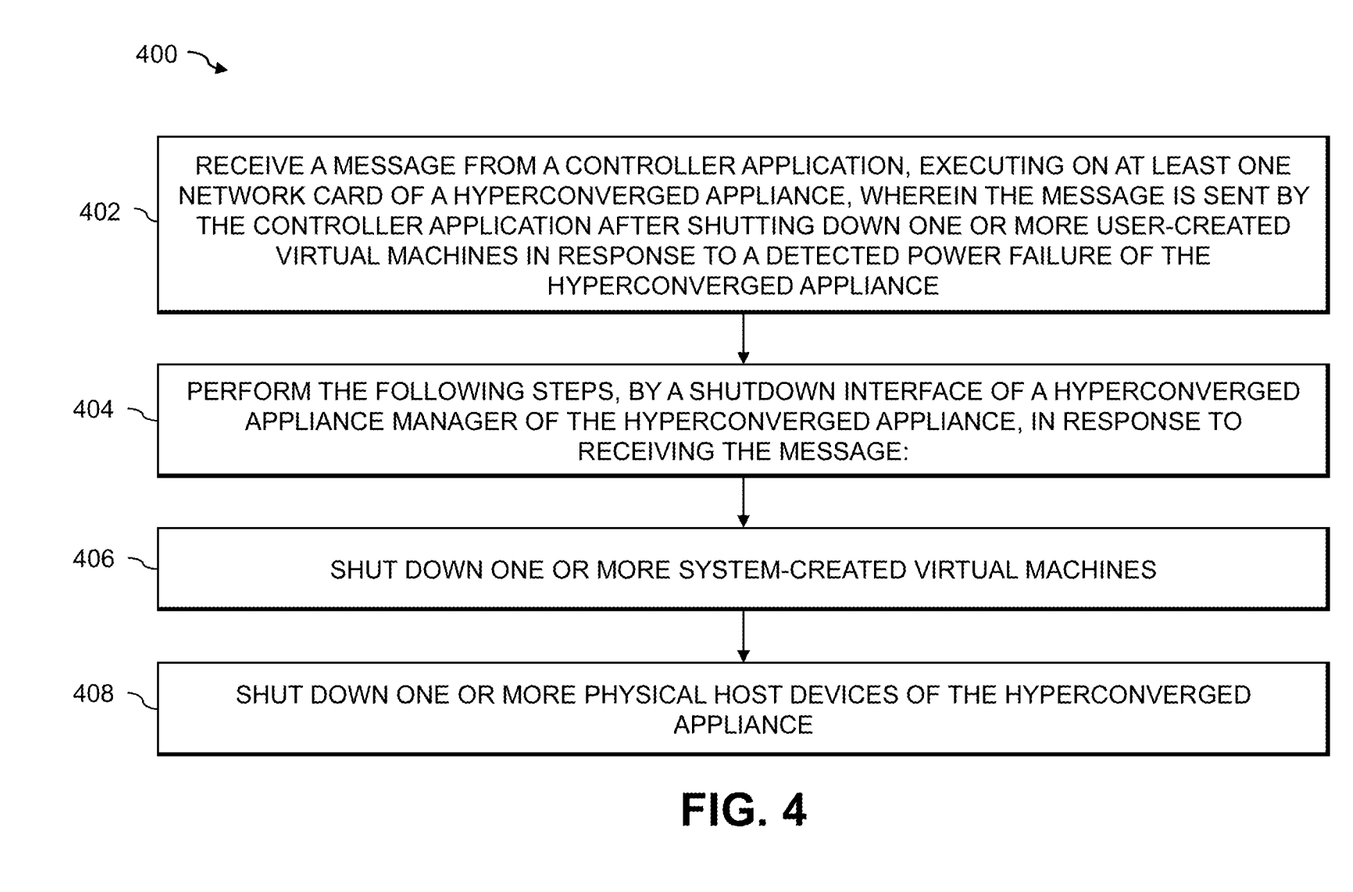
FIG. 4 is a flow diagram illustrating an exemplary implementation of a virtual machine shutdown orchestration process in accordance with an illustrative embodiment.

FIG. 4 is a flow diagram illustrating an exemplary implementation of a virtual machine shutdown orchestration process 400 in accordance with an illustrative embodiment. In the example of FIG. 4, in step 402, a message is received that was sent by a controller application, executing on at least one network card of a hyperconverged appliance, wherein the message is sent by the controller application after shutting down one or more user-created virtual machines in response to a detected power failure of the hyperconverged appliance. In step 404, the shutdown interface of a hyperconverged appliance manager of a hyperconverged appliance performs the following steps (e.g., steps 406 and 408), in response to receiving the message.

In some embodiments, the shutdown interface shuts down one or more system-created virtual machines in step 406 and shuts down one or more physical host devices of the hyperconverged appliance in step 408.

In some embodiments, the message in step 402 comprises a task completion message sent by the controller application upon a completion of the shutting down of the one or more user-created virtual machines. In response to the completion of the shutting down of the one or more user-created virtual machines by the controller application in step 402, the controller application may pass control to the shutdown interface and the controller application may shut itself down. The shutdown interface may confirm that the one or more user-created virtual machines have been shut down before performing the shutting down of the one or more system-created virtual machines and the two or more physical host devices.

In one or more embodiments, the execution of the controller application on the at least one network card may not employ resources of the two or more physical host devices. The shutdown interface may send a retry message to the controller application in response to determining that at least one of the one or more user-created virtual machines has not been shut down.

The particular processing operations described in conjunction with the flow diagrams and/or pseudo code of FIGS. 2 through 4 are presented by way of illustrative example only, and should not be construed as limiting the scope of the disclosure in any way. Alternative embodiments can use other types of processing operations for orchestrating a shutdown of virtual machines using a shutdown interface and a network card. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for virtual machine shutdown orchestration use a network card to implement the shutdown of the user-created virtual machines. In this manner, the user-created virtual machines can be shut down without consuming resources of the host devices that are being shut down, or resources provided by any external host devices.

One or more embodiments of the disclosure provide improved methods, apparatus and computer program products for orchestrating a shutdown of virtual machines using a shutdown interface and a network card. The foregoing applications and associated embodiments should be considered as illustrative only, and numerous other embodiments can be configured using the techniques disclosed herein, in a wide variety of different applications.

It should also be understood that the disclosed techniques for virtual machine shutdown orchestration, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for virtual machine shutdown orchestration may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprising cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based virtual machine shutdown orchestration engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based remote learning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
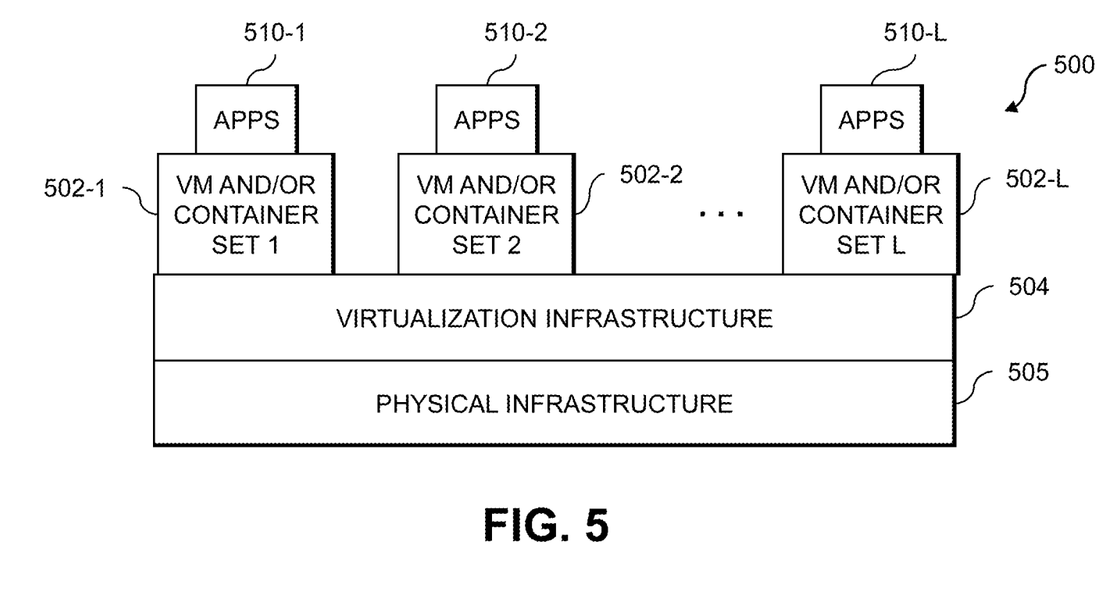
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 902 may comprise respective VMs, respective sets of one or more containers, or respective sets of one or more containers running in VMs.

In some implementations of the FIG. 5 embodiment, the VMs/container sets 902 comprise respective VMs implemented using virtualization infrastructure 504 that comprises at least one hypervisor. Such implementations can provide virtual machine shutdown orchestration functionality of the type described above for one or more processes running on a given one of the VMs. For example, each of the VMs can implement virtual machine shutdown orchestration control logic and associated functionality for performing at least some of the virtual machine shutdown functionality using a network card of the hyperconverged cluster management appliance 102.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 902 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide virtual machine shutdown orchestration functionality of the type described above for one or more processes running on different ones of the containers. For example, a container host device supporting multiple containers of one or more container sets can implement one or more instances of virtual machine shutdown orchestration control logic and associated functionality for performing at least some of the virtual machine shutdown functionality using a network card of the hyperconverged cluster management appliance 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 1002-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, a CPU, a GPU, a TPU, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 1002 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
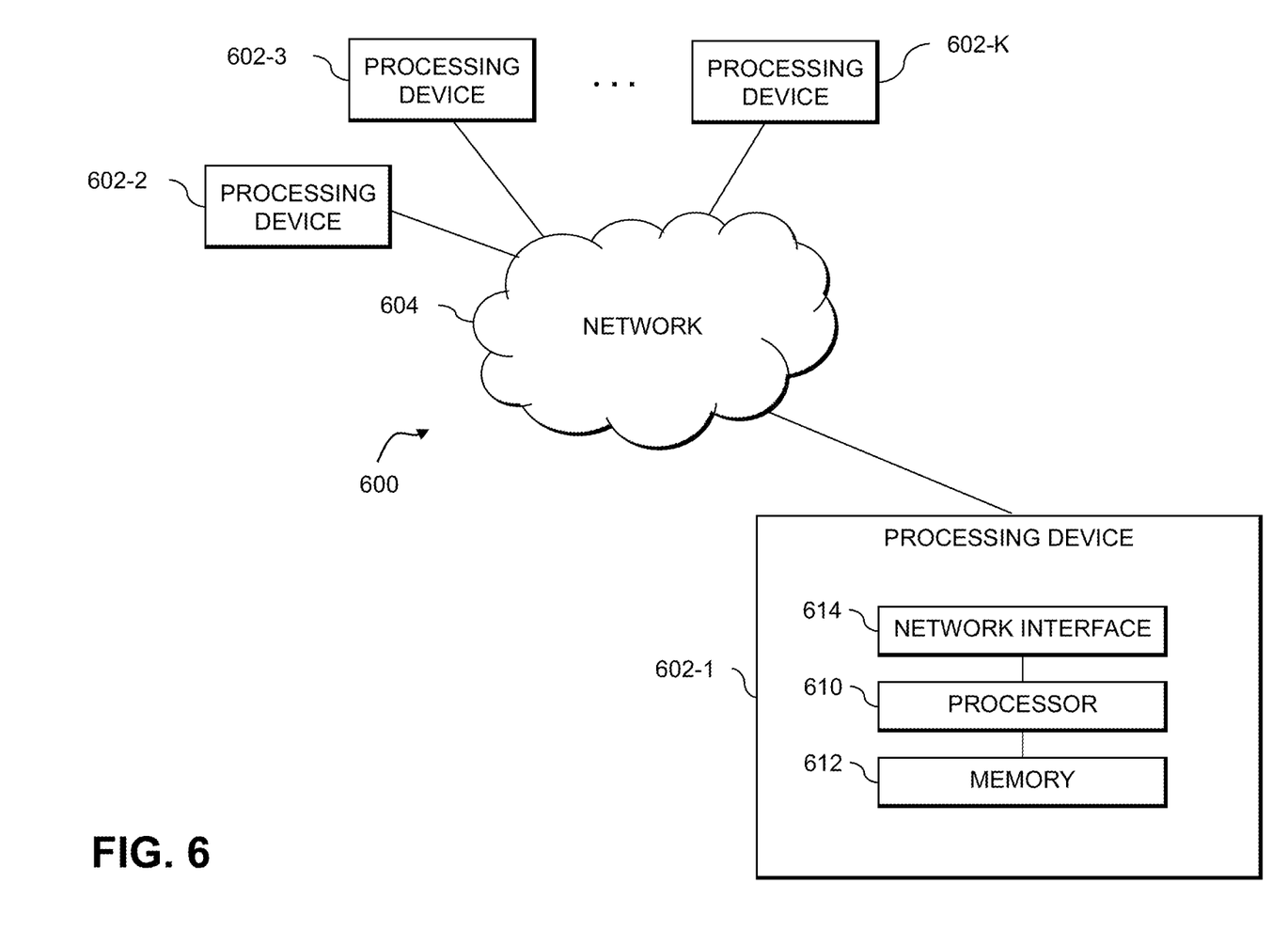
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a portion of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
receiving, by a shutdown interface of a hyperconverged appliance manager of the hyperconverged appliance, a message sent by a controller application, executing on at least one network card of a hyperconverged appliance, wherein the message comprises a task completion message sent by the controller application after a completion of shutting down one or more user-created virtual machines in response to a detected power failure of the hyperconverged appliance, wherein the hyperconverged appliance manager is implemented at least in part using at least one of one or more system-created virtual machines, wherein in response to a completion of the shutting down of the one or more user-created virtual machines by the controller application, the controller application passes control to the shutdown interface and the controller application shuts itself down;

performing the following steps, by the shutdown interface of the hyperconverged appliance manager, in response to receiving the message:

initiating a shutdown of the one or more system-created virtual machines; and initiating a shutdown of one or more physical host devices of the hyperconverged appliance;

wherein the method is performed by at least one processing device comprising a processor coupled to a memory.

2. The method of claim 1, wherein the power failure of the hyperconverged appliance is detected by a power supply device of the hyperconverged appliance that comprises the at least one network card.

3. The method of claim 1, wherein the execution of the controller application on the at least one network card does not employ resources of the one or more physical host devices.

4. The method of claim 1, wherein the shutdown interface comprises an application programming interface provided by the hyperconverged appliance manager.

5. The method of claim 1, wherein the one or more user-created virtual machines and the one or more system-created virtual machines execute on one or more of the physical host devices of a cluster provided by the hyperconverged appliance.

6. The method of claim 1, wherein the shutdown of the one or more system-created virtual machines is performed in a specified order to avoid a system error.

7. The method of claim 1, further comprising confirming that the one or more user-created virtual machines have been shut down before performing the shutting down of the one or more system-created virtual machines and the one or more physical host devices.

8. The method of claim 1, further comprising identifying the system-created virtual machines by accessing a folder that lists the system-created virtual machines.

9. The method of claim 1, wherein the functionality for shutting down the one or more user-created virtual machines by the controller application in response to the detected power failure of the hyperconverged appliance is integrated with the shutdown interface.

10. The method of claim 1, wherein the shutdown interface sends a retry message to the controller application in response to determining that at least one of the one or more user-created virtual machines has not been shut down.

11. The method of claim 1, wherein the shutting down of the one or more physical host devices comprises shutting down a plurality of the physical host devices in a sequence.

12. An apparatus comprising:

at least one processing device comprising a processor coupled to a memory;

the at least one processing device being configured to implement the following steps:

receiving, by a shutdown interface of a hyperconverged appliance manager of the hyperconverged appliance, a message sent by a controller application, executing on at least one network card of a hyperconverged appliance, wherein the message comprises a task completion message sent by the controller application after a completion of shutting down one or more user-created virtual machines in response to a detected power failure of the hyperconverged appliance, wherein the hyperconverged appliance manager is implemented at least in part using at least one of one or more system-created virtual machines, wherein in response to a completion of the shutting down of the one or more user-created virtual machines by the controller application, the controller application passes control to the shutdown interface and the controller application shuts itself down;

performing the following steps, by the shutdown interface of the hyperconverged appliance manager, in response to receiving the message:

initiating a shutdown of the one or more system-created virtual machines; and initiating a shutdown of one or more physical host devices of the hyperconverged appliance.

13. The apparatus of claim 12, wherein the power failure of the hyperconverged appliance is detected by a power supply device of the hyperconverged appliance that comprises the at least one network card.

14. The apparatus of claim 12, wherein the execution of the controller application on the at least one network card does not employ resources of the one or more physical host devices.

15. The apparatus of claim 12, wherein the functionality for shutting down the one or more user-created virtual machines by the controller application in response to the detected power failure of the hyperconverged appliance is integrated with the shutdown interface.

16. A non-transitory processor-readable storage medium having stored therein program code of one or more software programs, wherein the program code when executed by at least one processing device causes the at least one processing device to perform the following steps:

receiving, by a shutdown interface of a hyperconverged appliance manager of the hyperconverged appliance, a message sent by a controller application, executing on at least one network card of a hyperconverged appliance, wherein the message comprises a task completion message sent by the controller application after a completion of shutting down one or more user-created virtual machines in response to a detected power failure of the hyperconverged appliance, wherein the hyperconverged appliance manager is implemented at least in part using at least one of one or more system-created virtual machines, wherein in response to a completion of the shutting down of the one or more user-created virtual machines by the controller application, the controller application passes control to the shutdown interface and the controller application shuts itself down;

performing the following steps, by the shutdown interface of the hyperconverged appliance manager, in response to receiving the message:

initiating a shutdown of the one or more system-created virtual machines; and initiating a shutdown of one or more physical host devices of the hyperconverged appliance.

17. The non-transitory processor-readable storage medium of claim 16, wherein the execution of the controller application on the at least one network card does not employ resources of the one or more physical host devices.

18. The non-transitory processor-readable storage medium of claim 16, wherein the functionality for shutting down the one or more user-created virtual machines by the controller application in response to the detected power failure of the hyperconverged appliance is integrated with the shutdown interface.

19. The non-transitory processor-readable storage medium of claim 16, wherein the power failure of the hyperconverged appliance is detected by a power supply device of the hyperconverged appliance that comprises the at least one network card.

20. The non-transitory processor-readable storage medium of claim 16, wherein the shutdown interface comprises an application programming interface provided by the hyperconverged appliance manager.

* * * * *